US006073671A

United States Patent [19]

Chapman

[11] Patent Number: 6,073,671

[45] Date of Patent: Jun. 13, 2000

[54] WALLPAPER BORDER INSTALLATION SYSTEM

[76] Inventor: Loretta R. Chapman, 3770 Estates Dr., Florissant, Mo. 63033

[21] Appl. No.: 09/010,759

[22] Filed: Jan. 22, 1998

[51] Int. Cl.[7] ................................ B44C 7/00; B44C 7/06; B23Q 3/00; B23Q 3/18

[52] U.S. Cl. ............................ 156/574; 156/579; 269/15; 269/46; 269/909

[58] Field of Search ........................ 156/74, 574; 269/15, 269/46, 47, 53, 287, 318, 319, 909

[56] References Cited

U.S. PATENT DOCUMENTS

| | | | |
|---|---|---|---|
| 5,328,543 | 7/1994 | Campagna | 156/574 |
| 5,403,430 | 4/1995 | Araujo et al. | 156/523 |
| 5,403,432 | 4/1995 | Burch | 156/577 |
| 5,453,152 | 9/1995 | Mazzola et al. | 156/577 |
| 5,478,432 | 12/1995 | Vester | 156/574 |

*Primary Examiner*—Richard Crispino
*Assistant Examiner*—Sue A. Purvis
*Attorney, Agent, or Firm*—Paul M. Denk

[57] ABSTRACT

A wallpaper border installation aid is provided including a housing with a vertical slot formed therein. The housing is releasably mounted to a recipient surface, namely a wall. The slot is adapted to slidably receive a wallpaper border and maintain the same a predetermined distance from a ceiling during installation.

9 Claims, 3 Drawing Sheets

FIG. 3
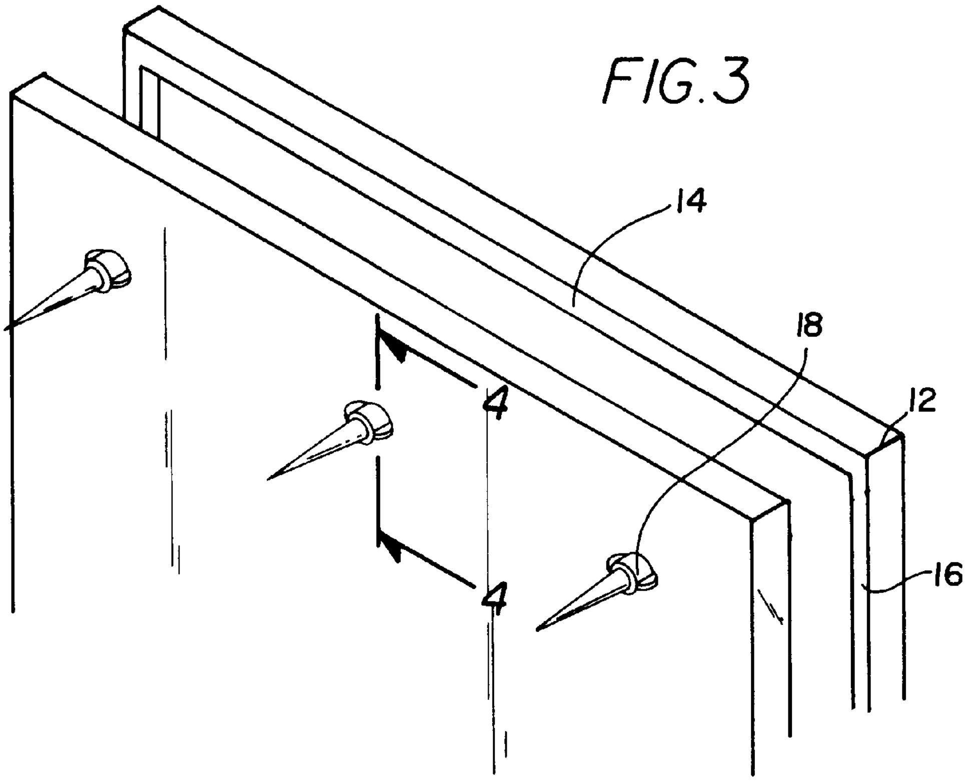
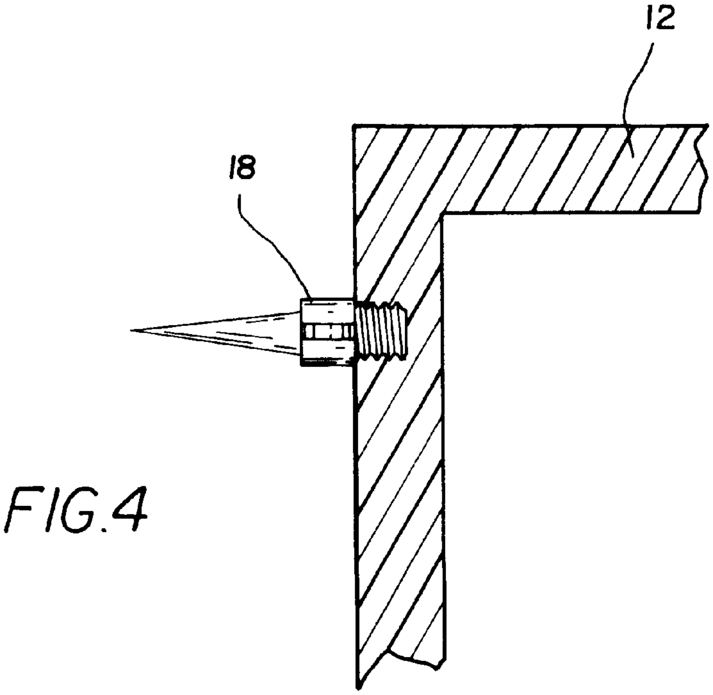
FIG. 4

WALLPAPER BORDER INSTALLATION SYSTEM

BACKGROUND OF THE INVENTION

1. Field of the Invention

The present invention relates to wallpaper installation devices and more particularly pertains to a new wallpaper border installation system for allowing a single user to install a wallpaper border.

2. Description of the Prior Art

The use of wallpaper installation devices is known in the prior art. More specifically, wallpaper installation devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art wallpaper installation devices include U.S. Pat. No. 5,453,152; U.S. Pat. No. 5,403,432; U.S. Pat. Des. No. 326,795; U.S. Pat. No. 5,267,718; U.S. Pat. No. 4,333,625; and U.S. Pat. No. 4,871,140.

In these respects, the wallpaper border installation system according to the present invention substantially departs from the conventional concepts and designs of the prior art, and in so doing provides an apparatus primarily developed for the purpose of allowing a single user to install a wallpaper border.

SUMMARY OF THE INVENTION

In view of the foregoing disadvantages inherent in the known types of wallpaper installation devices now present in the prior art, the present invention provides a new wallpaper border installation system construction wherein the same can be utilized for allowing a single user to install a wallpaper border.

The general purpose of the present invention, which will be described subsequently in greater detail, is to provide a new wallpaper border installation system apparatus and method which has many of the advantages of the wallpaper installation devices mentioned heretofore and many novel features that result in a new wallpaper border installation system which is not anticipated, rendered obvious, suggested, or even implied by any of the prior art wallpaper installation devices, either alone or in any combination thereof.

To attain this, the present invention generally comprises a housing having a planar square front face, a planar square rear face and a periphery formed therebetween. Such periphery is defined by a thin rectangular top face, bottom face, and pair of side faces which together define a hollow interior space, as shown in FIG. 1. The top face of the housing has an elongated linear slot formed therein between the side faces and along a central extent thereof. An upper portion of each of the side faces has a slot formed therein which resides in communication with the slot of the top face to define a vertical planar passage. As shown in FIG. 2, the slots of the side faces each have a plurality of spaced perpendicularly intersecting lateral slits formed therein along a height thereof for reasons that will soon become apparent. Also included is a plurality plastic covered pins each having a conical configuration. Such pins are mounted to the rear face of the housing and extend rearwardly therefrom, as shown in FIG. 2. In use, the pins are adapted to be removably coupled to a recipient surface. As best shown in FIGS. 5 & 6, a movable guide assembly includes a planar grate with a rectangular configuration defined by a pair of parallel long side edges and a pair of parallel short end edges. The movable guide is slidably situated within the interior space of the housing. While being slid vertically, the grate remains in a horizontal plane which is parallel with the top face. The grate has two pairs of resilient arms each having a first end coupled to a central extent of a bottom face of the grate. A second end of each arm extends from one of the short end edges of the grate. Each arm is situated along a diagonal of the grate. The second end of each arm has a sphere mounted thereon for gripping by a user. During use, the arms associated with each short end edge may be biased together thus allowing the vertical movement thereof within the slots of the side faces of the housing. Upon the releasing of the arms, the second ends thereof insert within an associated lateral slit for precluding movement of the grate. Finally, a drip drawer is provided including a bottom face and a periphery coupled thereto and extending upwardly to define an open top and an interior. The periphery includes a front face with a gripping handle mounted thereon. The drawer is slidably inserted within a cutout formed in the front face of the housing adjacent to the bottom face thereof. As such, the drawer is adapted for receiving paste dripping from a wallpaper situated within the slots of the housing and slid along the grate.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new wallpaper border installation system apparatus and method which has many of the advantages of the wallpaper installation devices mentioned heretofore and many novel features that result in a new wallpaper border installation system which is not anticipated, rendered obvious, suggested, or even implied by any of the prior art wallpaper installation devices, either alone or in any combination thereof.

It is another object of the present invention to provide a new wallpaper border installation system which may be easily and efficiently manufactured and marketed.

It is a further object of the present invention to provide a new wallpaper border installation system which is of a durable and reliable construction.

An even further object of the present invention is to provide a new wallpaper border installation system which is susceptible of a low cost of manufacture with regard to both materials and labor, and which accordingly is then susceptible of low prices of sale to the consuming public, thereby making such wallpaper border installation system economically available to the buying public.

Still yet another object of the present invention is to provide a new wallpaper border installation system which provides in the apparatuses and methods of the prior art some of the advantages thereof, while simultaneously overcoming some of the disadvantages normally associated therewith.

Still another object of the present invention is to provide a new wallpaper border installation system for allowing a single user to install a wallpaper border.

Even still another object of the present invention is to provide a new wallpaper border installation system that includes a housing with a vertical slot formed therein. The housing is releasably mounted to a recipient surface, namely a wall. The slot is adapted to slidably receive a wallpaper border and maintain the same a predetermined distance from a ceiling during installation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a rear perspective view of the present invention.

FIG. 4 is a cross-sectional view of one of the pins of the present invention taken along line 4—4 shown in FIG. 3.

DESCRIPTION OF THE PREFERRED EMBODIMENT

Figure 1:
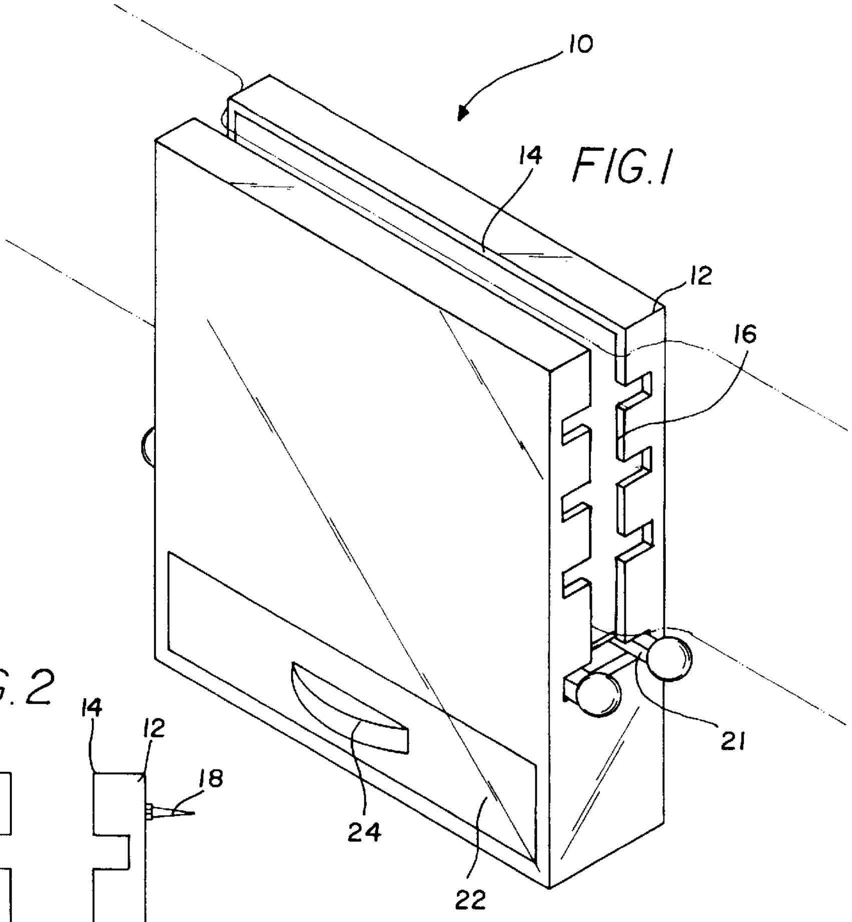
FIG. 1 is a perspective view of a new wallpaper border installation system according to the present invention.

With reference now to the drawings, and in particular to FIGS. 1 through 6 thereof, a new wallpaper border installation system embodying the principles and concepts of the present invention and generally designated by the reference numeral 10 will be described.

The present invention, designated as numeral 10, includes a housing 12 having a planar square front face, a planar square rear face and a thin periphery formed therebetween. Such periphery is defined by a thin rectangular top face, bottom face, and pair of side faces which together define a hollow interior space, as shown in FIG. 1.

Figure 2:
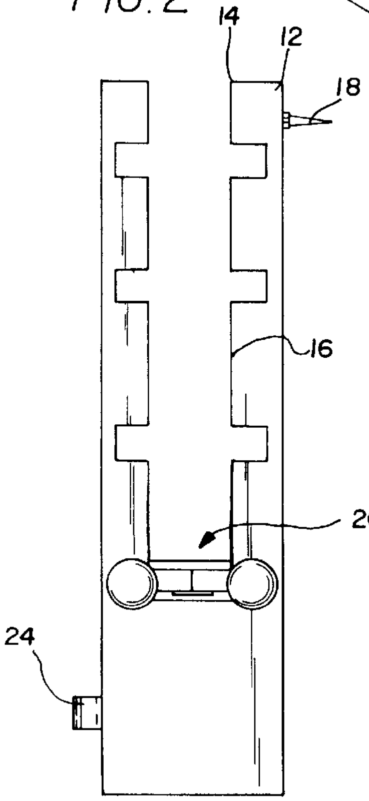
FIG. 2 is a side view of the present invention.

The top face of the housing has an elongated linear horizontal slot 14 formed therein between the side faces and along a central extent thereof. An upper portion of each of the side faces has a vertical slot 16 formed therein which resides in communication with the slot of the top face to define a vertical planar passage. Preferably, the vertical slots of the side faces extend along ¾ a total height of the housing. As shown in FIG. 2, the slots of the side faces each have a plurality of spaced perpendicularly intersecting lateral slits formed therein along a height thereof for reasons that will soon become apparent. In the preferred embodiment, the lateral slits includes slits which are spaced 2, 4, 6 and 8 inches from the top face of the housing.

Also included is a plurality of rubber or plastic covered pins 18 each having a conical configuration. Such pins are mounted to the rear face of the housing and extend rearwardly therefrom, as shown in FIG. 2. In use, the pins are adapted to be removably engaged with a recipient surface, namely a wall on which wallpaper is to be applied. As shown in FIG. 4, each pin has a metallic threaded inboard portion and a pair radially extending ears for allowing the removable coupling of the pins with threaded bores formed in the housing.

Figure 5:
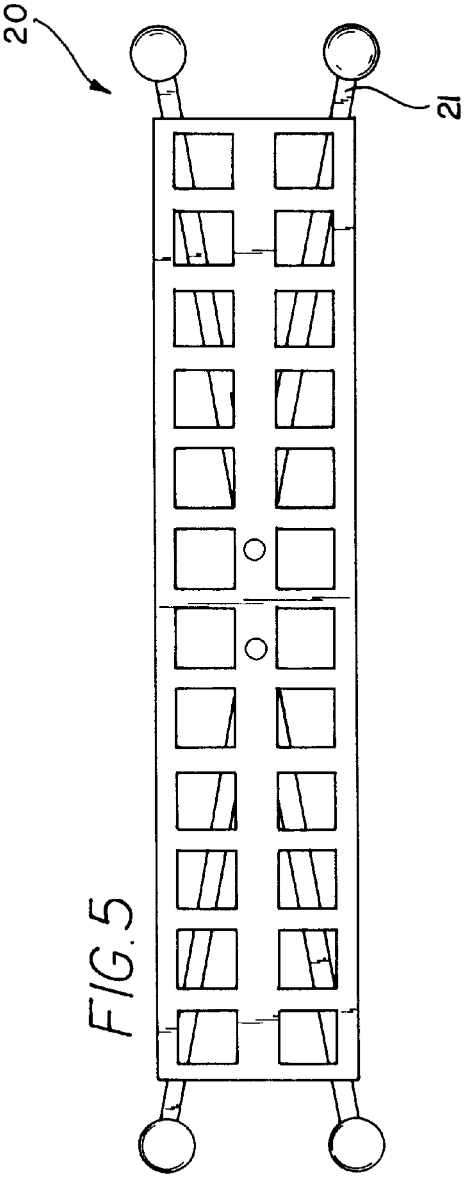
FIG. 5 is a top view of the guide assembly of the present invention.
Figure 6:
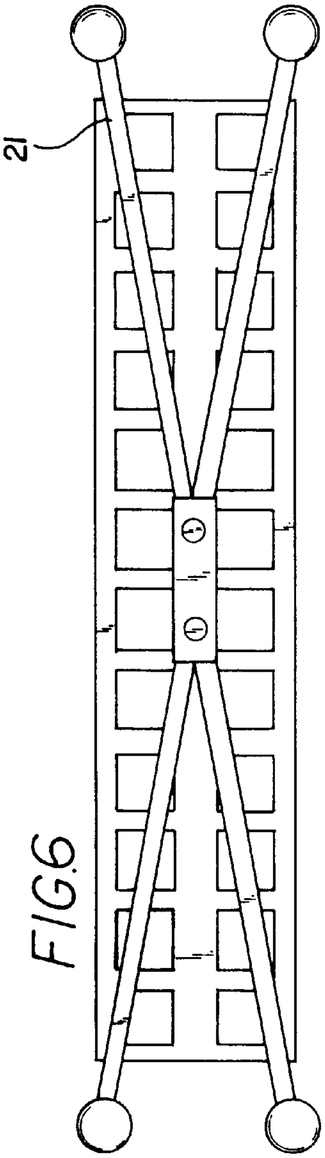
FIG. 6 is a bottom view of the guide assembly of the present invention.

As best shown in FIGS. 5 & 6, a movable guide assembly 20 includes a planar grate with a rectangular configuration defined by a pair of parallel long side edges and a pair of parallel short end edges. An area defined by the grate is preferably equal to that of the top and bottom face of the housing. Ideally, the grate has two rows of square cut outs formed therein. In operation, the movable guide is slidably situated within the interior space of the housing. While being slid vertically, the grate remains in a horizontal plane which is parallel with the top face.

The grate has two pairs of resilient arms 21 each having a first end coupled to a central extent of a bottom face of the grate and in general coplanar relationship therewith. A second end of each arm extends from one of the short end edges of the grate. Further, each arm is situated along a diagonal of the grate. The second end of each arm has a sphere mounted thereon for gripping by a user.

During use, the arms associated with each short end edge may be biased together thus allowing the vertical movement of the arms within the slots of the side faces of the \housing. Upon the releasing of the arms, the second ends insert within an associated lateral slit for precluding movement of the grate.

Finally, a drip drawer 22 is provided including a bottom face and a periphery coupled thereto and extended upwardly to define an open top and an interior. The periphery includes a front face with a gripping handle 24 mounted thereon. The drawer is slidably inserted within a cutout formed in the front face of the housing adjacent to the bottom face thereof. As such, the drawer is adapted for receiving paste which drips from a wallpaper or wallpaper border situated within the slots of the housing and slid along the grate.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wallpaper border installation aid comprising, in combination:

a housing including a planar square front face, a planar square rear face and a periphery formed therebetween defined by a thin rectangular top face, bottom face, and pair of side faces which together define a hollow interior space, the top face having an elongated linear slot formed therein between the side faces and along a central extent thereof, an upper portion of each of the side faces each having a slot formed therein which resides in communication with the slot of the top face to define a vertical planar passage, the slots of the side faces each having a plurality of spaced perpendicularly intersecting lateral slits formed therein along a height thereof;

a plurality plastic covered pins each having a conical configuration and mounted to the rear face of the housing and extending rearwardly therefrom for being removably coupled to a recipient surface;

a movable guide assembly including a planar grate with a rectangular configuration defined by a pair of parallel long side edges and a pair of parallel short end edges, the movable guide being slidably situated within the interior space of the housing and further constantly residing in a horizontal plane parallel with the top face, the grate having two pairs of resilient arms each having a first end coupled to a central extent of a bottom face of the grate and a second end extending from one of the short end edges of the grate with each arm being situated along a diagonal of the grate, the second end of each arm having a sphere mounted thereon for gripping such that the arms associated with each short end edge may be biased together thus allowing the vertical movement thereof within the slots of the side faces of the housing, whereby upon the releasing of the arms, the second ends thereof insert within an associated lateral slit for precluding movement of the grate; and a drip drawer including a bottom face and a periphery coupled thereto and extending upwardly to define an open top and an interior, the periphery including a front face with a gripping handle mounted thereon, the drawer being slidably inserted within a cutout formed in the front face of the housing adjacent to the bottom face thereof for receiving fluids dripping from a wallpaper situated within the slots of the housing and slid along the grate thereof.

2. A wallpaper installation aid comprising a housing with a vertical slot formed therein, the housing being releasably mounted to a recipient surface, the slot adapted to slidably receive wallpaper and maintain the same a predetermined distance from a ceiling during installation, a movable guide assembly is movable within the slot formed in the housing for selectively determining the predetermined distance.

3. The wallpaper installation aid as set forth in claim 2 wherein the movable guide assembly includes a grate.

4. A wallpaper installation aid as set forth in claim 3 and further including a removable containment means for catching fluid from the wallpaper located within said housing.

5. A wallpaper border installation aid comprising, in combination:

a housing including a planar square front face, a planar square rear face and a periphery formed therebetween defined by a thin rectangular top face, bottom face, and a pair of side faces, which together define a hollow interior space, said space extending through the housing and opening through both the side faces and the top face thereof, the top face formed having an elongated linear slot formed therein and extending downwardly between the side faces and along a central extent thereof, an upper portion of each of the side faces each having said slot form therein which resides in communication with the slot of the top face to define a vertical planar passage therethrough;

pin means mounted to the rear face of the housing and extending rearwardly therefrom for being removably coupled to a recipient surface;

wherein said formed slot within the rectangular housing adapted to slidably receive a strip of wallpaper therein and maintain the same a predetermined distance from a ceiling during installation.

6. The wallpaper installation as set forth in claim 5 wherein a movable guide assembly is movable within the slot formed in the housing for selectively determining the predetermined distance of the wallpaper strip from the ceiling during installation.

7. The wallpaper installation aid as set forth in claim 6 and wherein said movable guide assembly including a planar grate with a rectangular configuration defined by a pair of parallel long side edges and a pair of parallel short end edges, the movable guide being slidably situated within the interior space of the housing, within its formed slot, and further constantly residing in a horizontal plane parallel with the top face, the guide assembly having means to couple its planar surface to the housing, for selectively determining the predetermined distance for wallpaper border of varying heights from the ceiling during its installation.

8. The wallpaper installation aid as set forth in claim 7 and wherein said housing includes a space within its interior and above its bottom face to define a drip area where wallpaper paste fluids may collect during installation of a wallpaper border to an adjacent recipient surface.

9. The wallpaper installation aid as set forth in claim 8 and including a drip drawer located within the housing bottom space and provided for receiving the wallpaper paste adhesive fluids dripping from the wallpaper situated within the housing slot during installation of a wallpaper border to a recipient surface.

* * * * *